(12) United States Patent
Chadha et al.

(10) Patent No.: US 7,198,138 B2
(45) Date of Patent: Apr. 3, 2007

(54) AUTOMATIC SLACK ADJUSTER ASSEMBLY FOR VEHICLE BRAKING SYSTEM

(75) Inventors: Premjit Singh Chadha, New Delhi (IN); Nirmal Bhagat Choudhary, New Delhi (IN)

(73) Assignee: ANG Automotive India Private Limited, New Delhi (IN)

( * ) Notice: Subject to any disclaimer, the term of this patent is extended or adjusted under 35 U.S.C. 154(b) by 0 days.

(21) Appl. No.: 10/867,847

(22) Filed: Jun. 14, 2004

(65) Prior Publication Data

US 2005/0274578 A1 Dec. 15, 2005

(51) Int. Cl.
*F16D 55/00* (2006.01)

(52) U.S. Cl. .................................. 188/79.55

(58) Field of Classification Search .. 188/79.55–79.58, 188/196 BA
See application file for complete search history.

(56) References Cited

U.S. PATENT DOCUMENTS

| 3,371,755 | A | * | 3/1968 | Leeper | 188/196 BA |
| 3,618,715 | A | * | 11/1971 | Bostwick | 188/79.55 |
| 3,727,728 | A | * | 4/1973 | Bostwick | 188/79.55 |
| 3,949,840 | A | * | 4/1976 | Cumming et al. | 188/79.55 |
| 4,380,276 | A | * | 4/1983 | Sweet et al. | 188/79.55 |
| 4,484,665 | A | * | 11/1984 | Svensson | 188/79.55 |
| 4,544,046 | A | * | 10/1985 | Lissau | 188/79.55 |
| 4,621,714 | A | * | 11/1986 | Skurka | 188/196 BA |
| 4,895,226 | A | * | 1/1990 | Berg et al. | 188/79.55 |
| 5,036,958 | A | * | 8/1991 | Yamamoto | 188/79.55 |
| 5,350,043 | A | | 9/1994 | Crewson et al. | |

FOREIGN PATENT DOCUMENTS

| GB | 1 146 965 | 3/1969 |
| WO | WO 03/083322 | 10/2003 |

* cited by examiner

*Primary Examiner*—Chris Schwartz
(74) *Attorney, Agent, or Firm*—Merchant & Gould P.C.

(57) ABSTRACT

The invention pertains to the fluid powered brake systems of vehicles using brake drum and lined brake shoes internally expanded by cam. The invented device automatically adjusts the slack, which develops due to the wearing of brake liners and the drum. When the angular movement of the Lever Housing (1) exceeds the desired limit due to the wear, the internal device adjusts the excess clearance of slack automatically. The parts consist of a Worm Wheel (3); an enmeshing Worm Shaft (4); a Paul (6); a Leaf Spring (1); a Ratchet cylinder (5); an Acuator Rod (7); a Guide (9); an End Connector (8); a Clevis (2); and Clevis Pins (2A) and 2(B). When brakes are applied, the Actuator Rod (7) gets pulled out and engages the Paul (6) with the Ratchet cylinder (5). On the return stroke the Paul (6) rotates the worm shaft (4) which in turn rotates the worm wheel (3) and the attached cam thereby removing the slack.

9 Claims, 6 Drawing Sheets

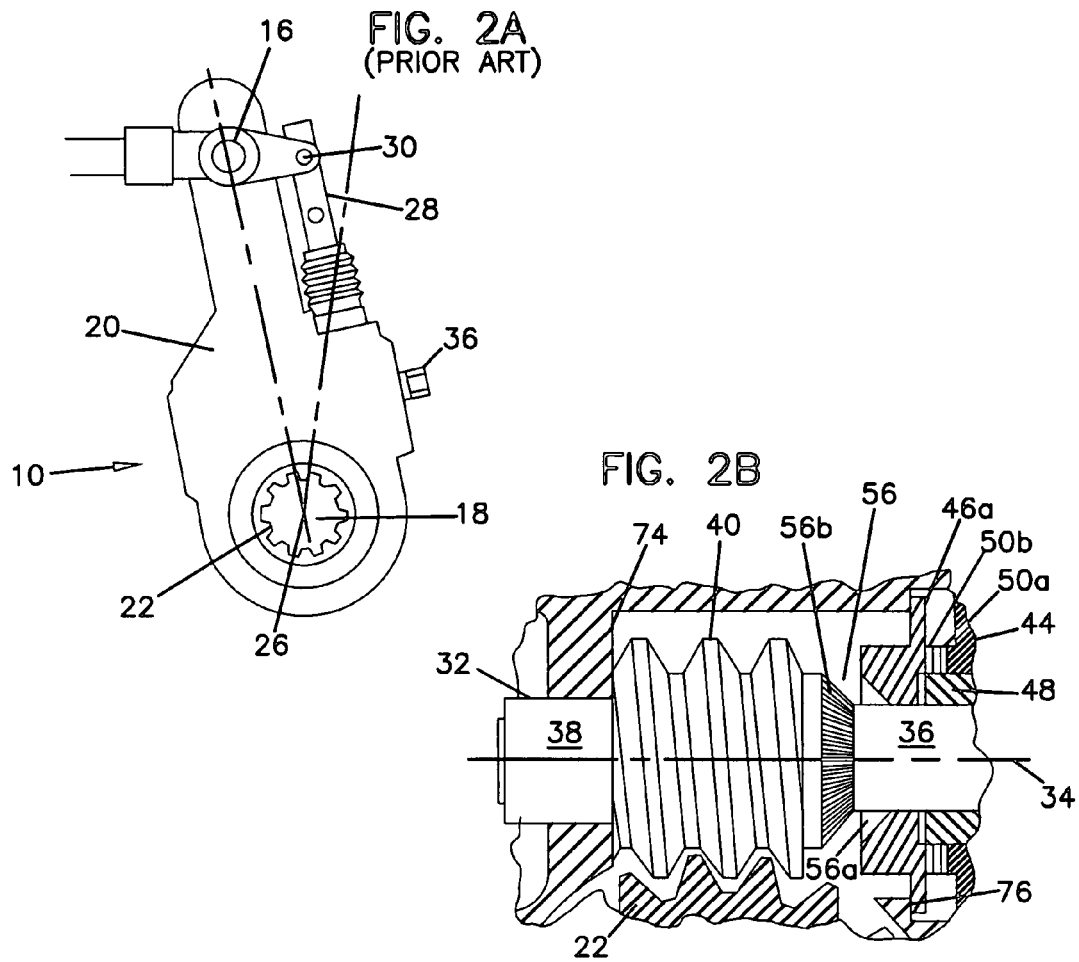
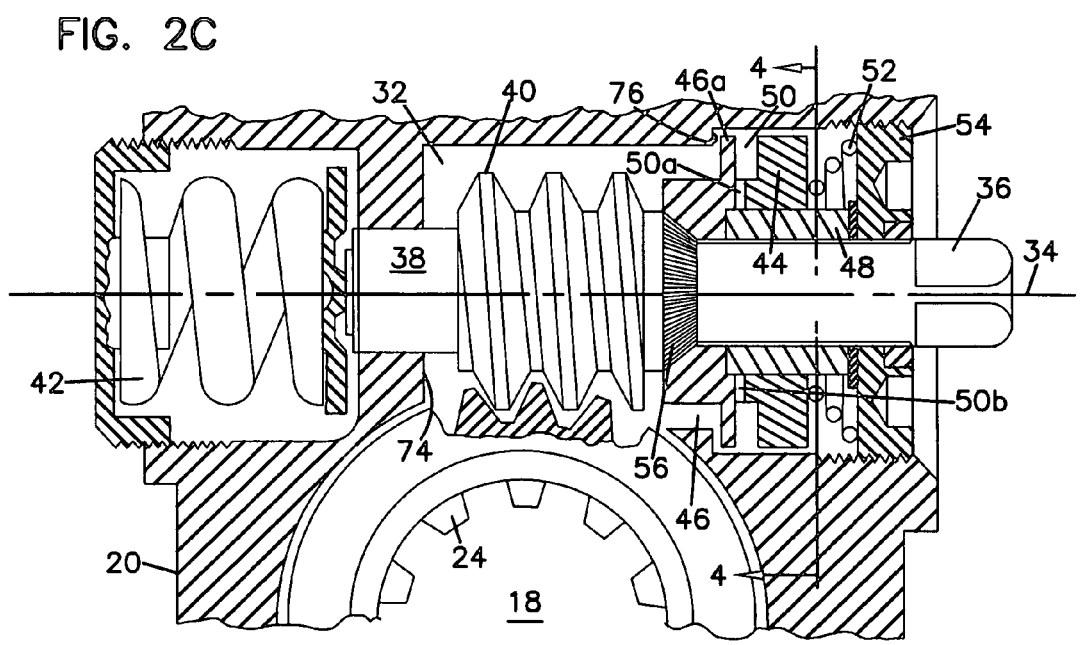

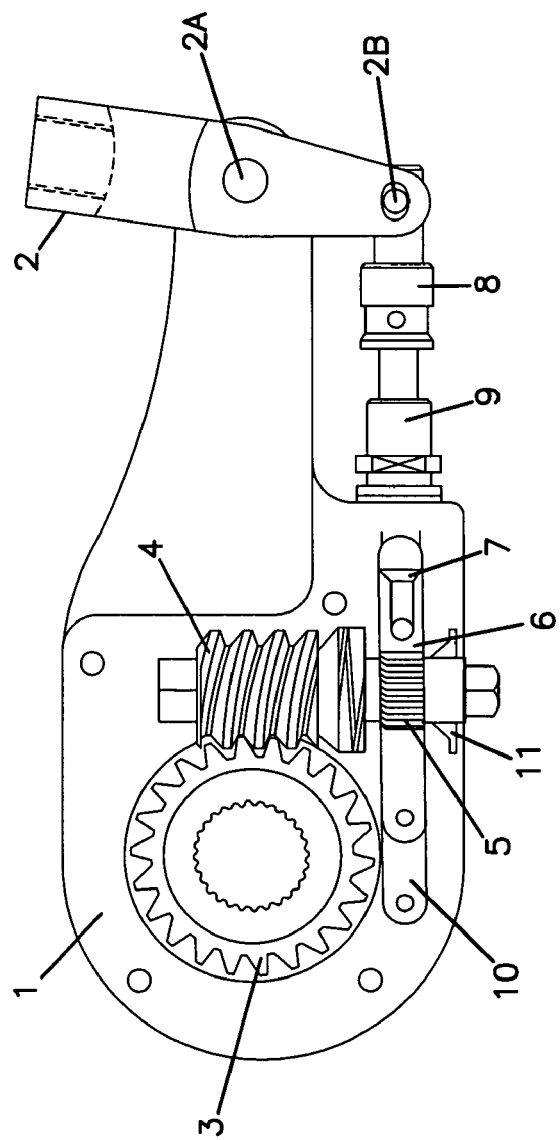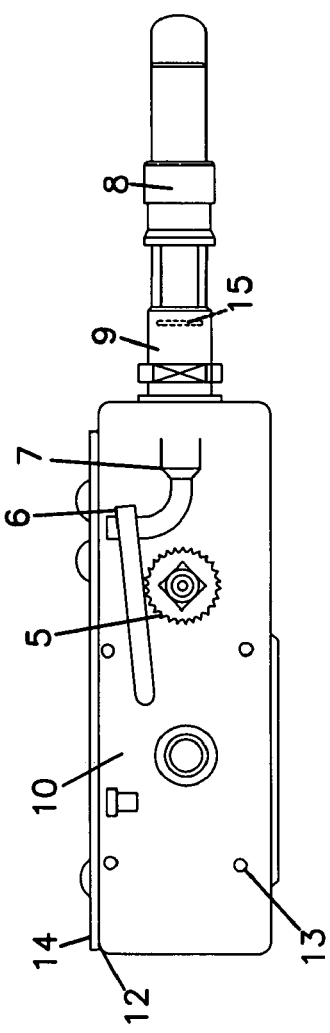
FIG. 5A
FIG. 5B

AUTOMATIC SLACK ADJUSTER ASSEMBLY FOR VEHICLE BRAKING SYSTEM

FIELD OF INVENTION

The present invention relates to a vehicle braking system and more particularly to an automatic slack adjusting assembly of novel construction and mode of operation, which actuates a cam for brake application in fluid operated brakes of medium and heavy vehicles. The present invention adjusts the slack automatically, yet does not affect the provision of manual adjustment of the braking parts.

BACKGROUND

The invention pertains to a pneumatically powered brake system for medium and heavy vehicles. These vehicles invariably use internally expandable brake shoes lined with friction material. The braking effect in the vehicles is produced when these shoes make contact with a drum mounted on the driving or trailing wheels. The expansion of the brake shoes is done by S-profiled cams, which push the shoes out when the cam is rotated. The cam is rotated by a lever arm, at the end of which a force is applied by an air chamber, which gains its thrusting force by compressed air. These brake systems are therefore referred to as pneumatically operated brakes.

As the vehicles run, the brake is applied several times, which causes wear of the friction lining of the brake shoes along with that of brake drum. Over time, the clearance between the brake shoes and drum increases due to this wear. The enlarged clearance which is hereto called "Slack" demands more cam rotation, which in turn needs a larger stroke of the air chamber. The air chamber stroke is limited. A situation may arise when the full air chamber stroke would fail to expand the brake shoes enough for effective braking.

When the braking system of a vehicle develops slack, it needs to be adjusted for effective braking. For carrying out this operation, the vehicle is to be grounded and adjustment is to be made by trained mechanics or auto-work shops. This results in productive time loss. The slack adjuster is provided with a Worm and Gear system in such a way that by rotating the Worms the s-cam also rotates and subsequently eliminates the slack, i.e. the clearance developed between the brake shoes and the drum. The brake thus becomes effective again. This is normally termed as "brake adjustments".

Vehicles need to be taken to a workshop for carrying out this brake adjustment which causes a loss of productive time of the vehicle. Any negligence in getting the adjustment done in time may also cause accidents due to non-effective braking. The brake adjustments are required several times during the life of the brake linings, resulting in loss of several productive days. The effectiveness of braking may also get impaired if timely adjustments are not carried out.

To circumvent the problem of manual adjustment of brakes periodically, a few manufacturers of Slack Brake Adjusters have incorporated a system to automatically adjust the slack or the clearance between the brake shoes and the drum. These systems use several parts like small gears, racks, coil springs, clutches and retainers, etc.

Patent number GB1146965, shown in FIG. 1, describes sensing from external anchoring at the vehicle chassis. In the prior art application, use of clutches, gear trains, and both secondary and primary worms results in slack adjustment.

In patent number U.S. Pat. No. 5,350,043, shown in FIGS. 2A–2C, an automatic slack adjuster causing reduction of slack present in a vehicle brake system upon brake release is defined. The slack adjuster incorporates a member cooperating with a slack adjusting rotor to determine a reference position for the rotor and to return the rotor to such reference position at the completion of each brake operational cycle. Slack adjuster 10 includes an elongated housing 20 having a bore opening adjacent one end for receiving pivot pin 16 and a bore opening adjacent an opposite end for rotatably supporting a worm gear 22. The worm gear 22 is keyed to cam shaft 18, as by a spline connection 24, for rotation about a first axis 26. Slack adjuster 10 is also connected to clevis 14 via a link 28, which is slidably supported by housing 20 and has a protruding end pivotally connected to the clevis by a pivot pin 30. Such a slack adjustment is incorporated with sensing by use of the Clevis, rotation of worm by heavy spring loaded clutch and rotor, and use of the internal worm mounted cam, pushes and spring loaded stopper. The system as described in the prior art is extremely complex and makes the system cumbersome. The complexity of the system makes the prior art system extremely difficult to implement with reduced efficiency of the system as a whole.

In publication number WO03083322, shown in FIG. 3, an automatic brake adjuster for adjusting the slack between the brake lining and brake drum of a vehicular braking system is defined. The brake adjuster includes a housing (1) accommodating an internally splined worm wheel (3) for receiving the S-cam shaft of the system; a worm shaft (4) positioned perpendicularly to the axis of the worm wheel (3) and meshing therewith; a control arrangement (12, 13, 14, 15 and 17) for controlling the movement of a clutch worm wheel (6), depending upon the angular movement of the adjuster, clutch worm wheel (6) being mounted on the worm shaft (4) and forming a clutch by serration (6') of the clutch worm wheel engaging with the serration (4') of the worm shaft, under the influence of a heavy compression spring (9), the control gear (12) located in the worm wheel bore of the body (1) being permanently fastened to the control arm (13) having a fixing arrangement (13') for rigidly fixing to the chassis of the vehicle, to establish a reference; a pinion assembly comprising a ratchet (16') and pawl (26) mechanism between the pinion (16) and the control worm screw (19), Guide (20), screw (21), spindle (23) and spring (24) and positioned parallel to the axis to control gear wheel (12) and perpendicular to the axis of worm shaft (4), the pinion (16) meshing with the control gear wheel (12) and being guided in the body (1), whereby the ratchet (16') and pawl (26) mechanism provided between pinion (16) and control worm screw (19) functions as one-way lock and allows free rotation of pinion (16) during counter clockwise rotation under resistance from the pawl spring (27) to prevent over-riding while clutch worm gear (6) is in disengaged condition the ratchet (16') and pawl (26) mechanism also permitting required axial movement of the control worm screw (19) to control the desired slack, the excess lining clearance being thus sensed to reference point and adjusted by said ratchet (16') and pawl (26) mechanism to maintain optimum brake lining clearance. Hence, the prior art discloses sensing from external anchoring at chassis. Worm mounted spring to loaded clutch connected to the secondary worm and gear to provide rotation to the primary worm.

Such prior devices had certain disadvantages:
  Higher cost
  Too bulky and need either modification for installation or need external anchoring bracket for connection to a chassis.
  Use too many parts and miniature clutch systems which tend the wear out and malfunction.

Cannot be sealed properly against ingress of water/water mists and dust, thereby exposing the parts to wear and failure.

Some devices are not interchangeable for left and right side application and the direction of thrust.

OBJECTS OF THE INVENTION

Accordingly, the primary object of the invention is to provide a novel automatic slack adjuster in vehicle braking system.

Another object of the present invention is to provide a unidirectional worm-rotating device so that the worm, once rotated, does not revert to its original position.

Another object of the present invention is to provide a constant incremental adjustment through 360° of the cam rotation, though normally the cam does not rotate more than 120° during the lifetime of the brake.

Another object of the invention is to provide nearly constant free movement of the lever housing to a predetermined angular range within which the automatic mechanism remains dormant, thereby avoiding over-adjustment.

Yet, another object of the present invention is to provide optimum clearance between the brake lining and the drum surface.

Another object of the present invention is the interchangeability for right side and left side application.

Another object of the present invention is easy adaptability, initial mounting and adjustment in the existing brake system without alteration.

Another object of the present invention is to provide a construction, which could be sealed against the ingress of dust and moisture, and to retain lubricants inside the assembly.

SUMMARY OF THE INVENTION

The present invention leads to rotation of the worm, which in turn rotates the engaging gear coupled to the s-cam shaft. The rotation of the worm occurs only when the clearance between the brake shoes and drum increases to a predetermined extent. The worm-rotating device also needs to be unidirectional so that the worm, once rotated, does not revert to its original position. In order to achieve this basic requirement, the worm has been designed with an integrated ratchet cylinder which can be rotated only in one direction by a paul. The linear movement of the paul is provided by an actuator rod, linked by a clevis to the push rod of the air chamber which actuates the brake.

BRIEF DESCRIPTION OF THE FIGURES

FIGS. 2A–2C: illustrates the slack adjuster of U.S. Pat. No. 5,350,043 having a clevis, spring loaded with a clutch, rotor, and internal worm mounted cam.

FIGS. 5A–5B: illustrates a front view and top view, respectively, of the brake adjuster assembly in an initial position.

DETAILED DESCRIPTION OF THE INVENTION

Accordingly, the present invention relates to a slack adjuster, which automatically adjusts the slack between the brake drum and the brake lining riveted to the brake shoes. The brake shoes expand with the rotation of an S-profiled cam.

Figure 6A:
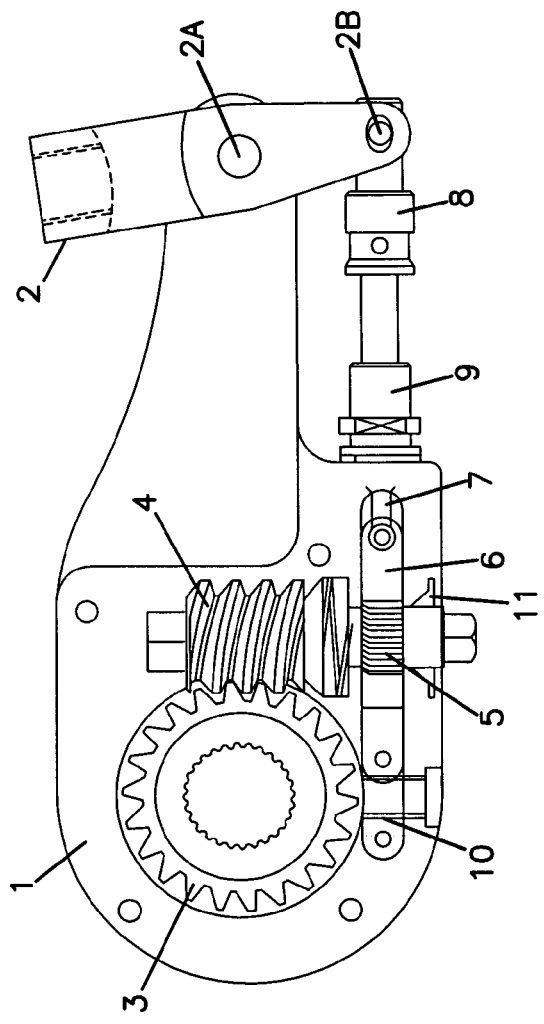
FIGS. 6A–6B: illustrates a front view and top view, respectively, of the brake adjuster assembly in a brake applied position.
Figure 6B:
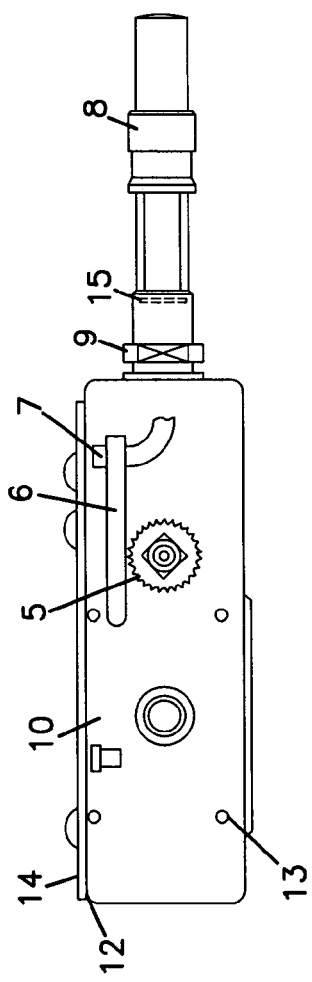

In FIGS. 6A–6B, the automatic slack adjuster assembly for a vehicle braking system comprises (a) a lever housing (1) accommodating a worm-wheel means having a splined bore to receive camshaft, said worm-wheel means comprising a worm in functional relationship with a wheel (3);

(b) a worm shaft (4) having a ratchet cylinder (5) portion, enmeshed in said worm at a right angle to the axis of the wheel;

(c) a paul (6) positioned over the ratchet cylinder (5) portion of the worm shaft (4) inside a machined guideway in the housing (1);

(d) a leaf spring (10) located on one end of the machined guideway pressing down the paul;

(e) an actuator rod (7) linked to the paul (6) runs inside a guide (9), opposite to the end of the leaf spring guideway, and provides linear motion to the paul (6), the acuator rod (7) connected to an end connector, said end connector being connected to a clevis (2) by means of a clevis pin (2B), and (f) the clevis (2) attached externally to the Lever Housing (1) by clevis pin (2A), and (g) a force exerting means, connected to the clevis pin (2A) for providing necessary force.

In yet another embodiment of the present invention, the wheel in the worm-wheel means is a gear wheel.

In another embodiment of the present invention, the assembly is sealed using a sealing assembly, said sealing assembly comprising a cover (14); gasket (12); O rings (13); worm shaft seal (11); actuator rod O-Ring (15) and bellows (not shown).

In another embodiment of the present invention, said sealing assembly avoids ingress of dust and moisture and retains lubricants inside the assembly.

In another embodiment of the present invention, the paul is a special engineered material single tooth bar.

In another embodiment of the present invention, the uni-directional paul and ratchet drive are utilized to achieve adjustment of slack automatically in cam operated vehicle brakes.

In another embodiment of the present invention, offsetting of the paul tooth away from the center line of the ratchet cylinder determines the amount of angular rotation of the lever housing during which automatic adjustment is not desired.

In another embodiment of the present invention, the tooth position in the paul is off set so that the paul does not engage the ratchet cylinder for a pre-determined angular movement of the lever housing.

In another embodiment of the present invention, the predetermined angular movement is preferably in the range of 12°. to 16°.

In another embodiment of the present invention, the paul is a special engineered toothed plate.

Figure 1:
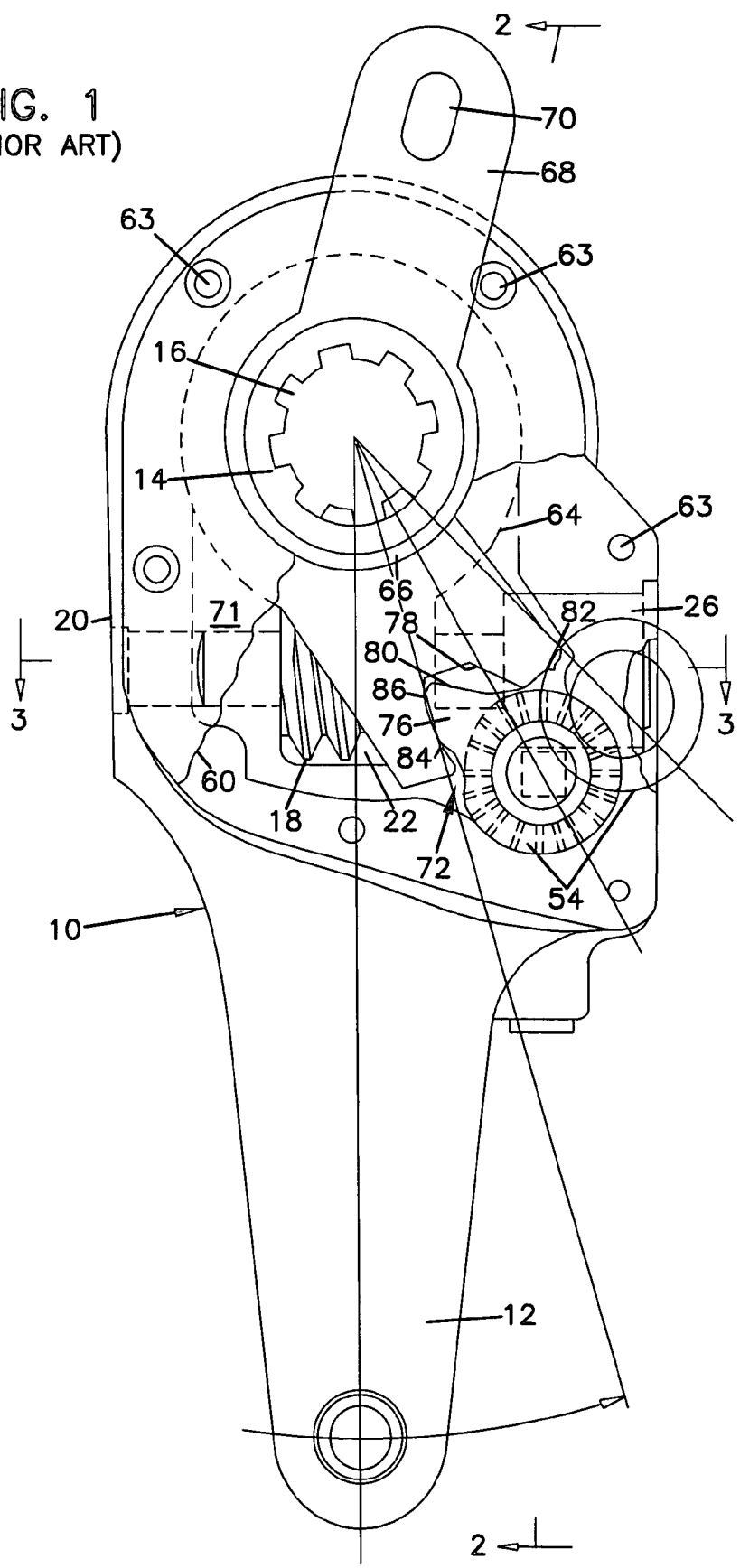
FIG. 1: illustrates the slack adjuster of GB1146965 having clutches, gear trains, and both secondary and primary worms.
Figure 3:
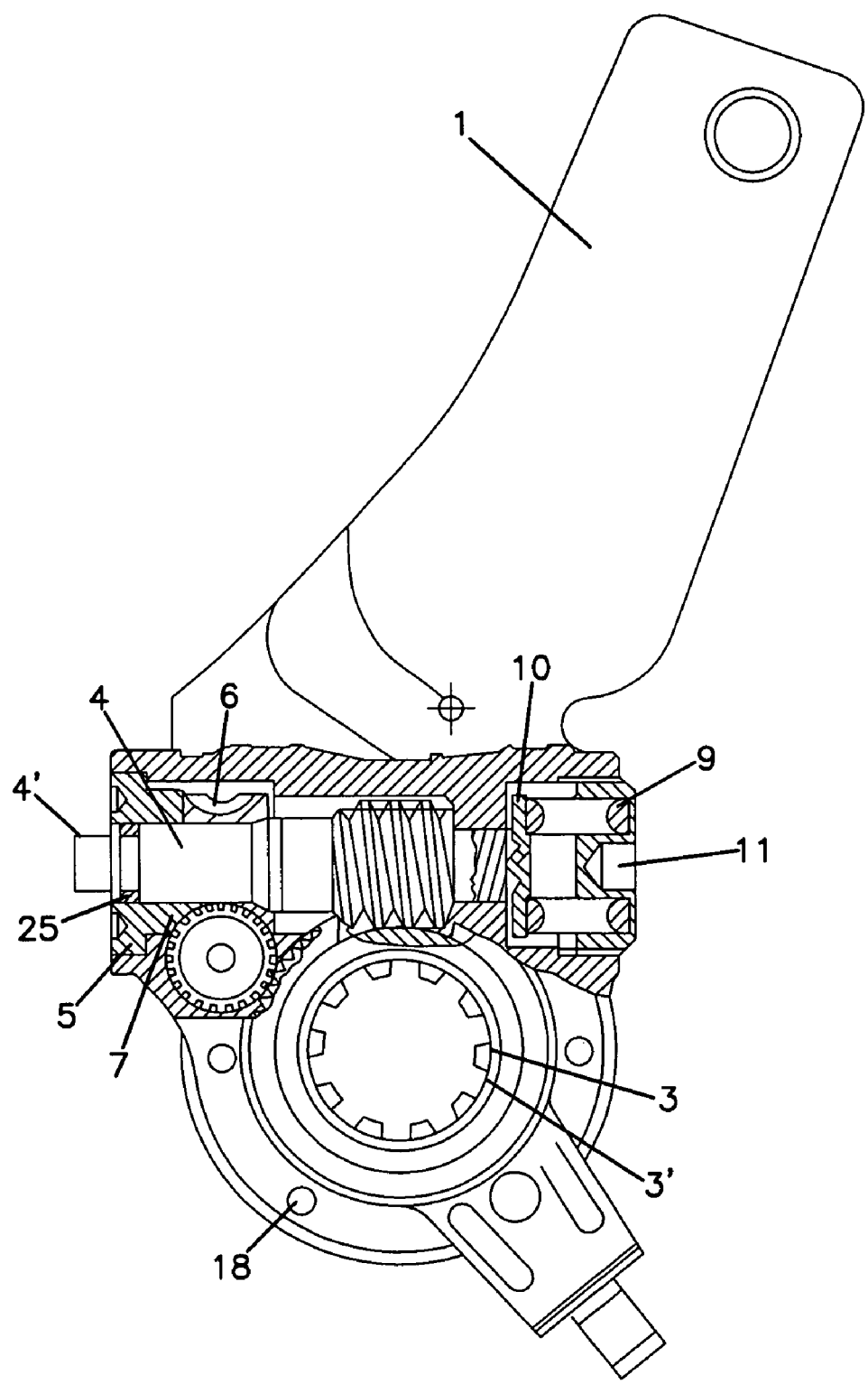
FIG. 3: illustrates the slack adjuster of WO03083322 having external anchoring, secondary worm and gear assembly.
Figure 4:
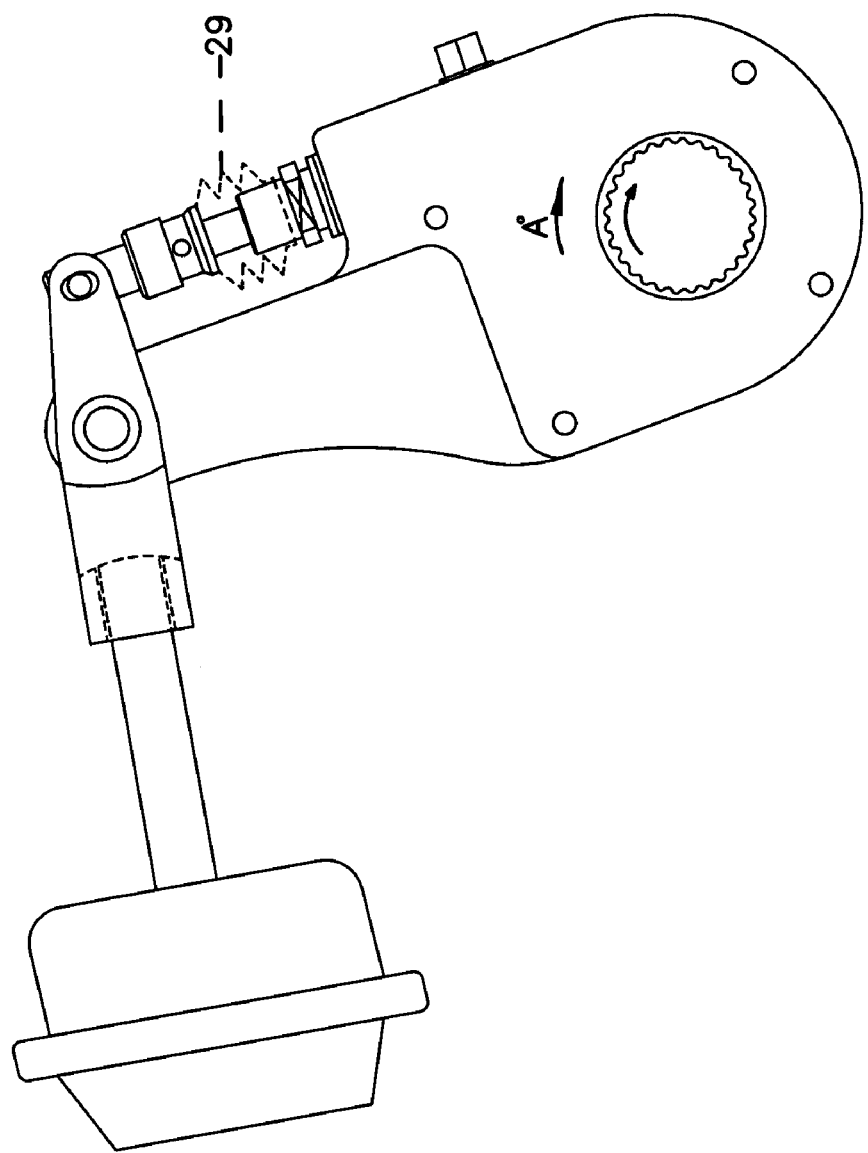
FIG. 4: illustrates a brake adjuster assembly in superimposed initial and extended positions.

In FIG. 4, the rotation of the camshaft through angle A when the brake adjuster assembly is pushed by the air chamber through push rod and clevis is shown. The actuator rod in brake applied position gets pulled out and in turn places the Paul (6) in an engaging position with Ratchet Cylinder (5) teeth as shown in FIG. 6A. When the brake is released and the brake adjuster reverts to the initial position by the air chamber, the Paul (6) rotates the worm shaft, which in turn rotates Worm wheel (3) thereby adjusting the slack. The offsetting of the Paul (6) tooth ensures that its engagement with Ratchet cylinder (5) occurs only after a certain angular movement of the brake adjuster assembly. When slack is not developed, the brake adjuster angular movement is less which does not allow the Paul (6) to ride over the Ratchet cylinder (5) and therefore the Worm Shaft (4) does not rotate and thereby avoids the adjustment to take place. When the angle is increased, which happens when the slack is developed, the adjustment takes place. Thus, the mechanism maintains the desired clearance between the brake lining and the drum.

In yet another embodiment of the present invention, the unidirectional Paul (6) and Ratchet (5) drive is utilized to achieve the adjustment to the Slack automatically in cam operated vehicle brakes.

In yet another embodiment of the present invention, off-setting of the Paul (6) tooth away from the center line of the Ratchet Cylinder determines the amount of angular rotation of the Lever Housing (1) during which automatic adjustment is not desired.

In yet another embodiment of the present invention, application of the unidirectional Paul and ratchet drive achieves the adjustment of slack automatically in pneumatically operated vehicle brakes.

The Slack Adjuster assembly is mounted over the cam shaft splines. It is linked to the push rod of the air chamber by means of a clevis having two holes, one big and other small as given in FIG. 4. When compressed air is fed to the air chamber, the linear outward motion of the push rod gives angular movement to the slack adjuster assembly, which in turn rotates the cam shaft as shown in FIGS. 5A–5B, thereby expanding the brake shoes for brake application. It is evident from the figures that the distance between the small clevis hole to the worm axis gets extended. This extension pulls out the actuator rod. FIG. 4 shows a superimposed view of the slack adjuster assembly in "initial" or home position and in "brake applied" position. The extended distance, or the amount by which the actuator rod gets pulled out, is in direct proportion to the angle "A" of the cam shaft rotation. A lesser angle corresponds to a lesser pull out amount of the actuator rod.

The actual construction details of the slack adjuster assembly are shown in FIGS. 5A–5B and FIGS. 6A–6B. FIGS. 5A–5B shows the home position and FIGS. 6A–6B shows the actuator rod pulled out to the maximum. In this extended position the paul tooth engages with the ratchet cylinder on the worm. When the assembly retracts back to the "home" position, the paul pushes the ratchet thereby making the worm rotate. The worm then rotates the gear and the gear, coupled to the camshaft, rotates the cam.

Initially, when the brake linings are new, the clearance between the brake shoes and drum is the at its minimum and requires less angular movement of the slack adjuster for effective brake application. The tooth position in the paul is sufficiently offset so that movement up to about 12/14 degrees does not make the paul tooth engage with the ratchet. In this range, the paul body slides over ratchet teeth. The leaf spring allows the paul to lift-up for engagement but also exerts sufficient force to avoid its disengagement when operating.

As wear on the lining and drum takes place, the clearance between the brake shoes and drum increases, causing arm movement exceeding 14°. This also includes the angular shift caused by the flexing of the brake systems parts such as the cam shaft, shoes, bearings, clearances etc.

As and when this happens, the paul comes into function and reduces the clearance by rotating the cam shaft until the arm movement falls below 14°. The automatic adjustments therefore remain dormant until the arm movement again exceeds 14°. With the automatic adjustment in operation, the arm movements are limited to around 14°/16° only and hence automatically control the air chamber stroke. This results in reduced air consumption and limited flexing of the air chamber diaphragm.

Other advantages include:

Gain in productive days of vehicles because manual adjustments are not needed.

Elimination of brake adjustment costs.

Uniformity of brake performance because optimal clearance is maintained.

Greater reliability.

We claim:

1. An automatic and manual slack adjuster assembly for vehicle braking system, said brake adjuster assembly comprising:
   (a) a lever housing accommodating a worm-wheel means having a splined bore to receive a camshaft, said worm-wheel means comprising a worm in functional relationship with a wheel;
   (b) a worm shaft having a ratchet cylinder portion enmeshed in said worm at right angle to the axis of the wheel;
   (c) a pawl positioned over the ratchet cylinder portion of the worm shaft inside a machined guideway in the lever housing;
   (d) a leaf spring located on one end of the machined guideway pressing down the pawl;
   (e) an actuator rod linked to the pawl inside an actuator guide, opposite to the end of the machined guideway, providing linear motion to the pawl, the actuator rod connecting to an end connector, said end connector being connected to a clevis by means of a first clevis pin, and
   the clevis attached externally to the lever housing by a second clevis pin, and
   (f) a force exerting means connected to the clevis for providing a necessary force wherein a tooth position of the pawl is off-set from a center line of the ratchet cylinder so that the tooth does not engage the ratchet cylinder for a predetermined angular movement of the brake adjuster assembly.

2. The automatic and manual slack adjuster assembly as claimed in claim 1, wherein said assembly is sealed using a sealing assembly, said sealing assembly comprising cover, gasket, O-rings, worm shaft seal, actuator O-ring and bellows for avoiding ingress of dust and moisture and to retain the lubricants inside the assembly.

3. The automatic and manual slack adjuster assembly as claimed in claim 1, wherein the wheel in the worm-wheel means is a gear wheel.

4. The automatic and manual slack adjuster as claimed in claim 1, wherein the force exerting means is a fluid chamber having a push rod.

5. The automatic and manual slack adjuster assembly as claimed in claim 1, wherein the pawl is unidirectonal and a ratchet drive is used to achieve the adjustment of slack automatically in a cam operated vehicle brake.

6. The automatic slack adjuster assembly as claimed in claim 5, wherein a tooth position in the pawl is off set so that the pawl does not engage with the ratchet cylinder for a predetermined angular movement of the said lever housing.

7. The automatic and manual slack adjuster assembly as claimed in claim 1, wherein a tooth position in the pawl is offset so that the pawl does not engage with the ratchet cylinder for a predetermined angular movement of the said lever housing.

8. The automatic and manual slack adjuster assembly as claimed in claim 1, wherein the predetermined angular movement is in the range of 12° to 16°.

9. The automatic and manual slack adjuster assembly as claimed in claim 1, wherein the predetermined angular movement is 14°.

* * * * *